United States Patent [19]

Hartsock et al.

[11] Patent Number: 5,364,131
[45] Date of Patent: Nov. 15, 1994

[54] QUICK-CONNECT TUBULAR COUPLING

[75] Inventors: Dale L. Hartsock, Livonia; John C. Caverly, Dearborn; Fred G. Schroeder, Grosse Ile; Claudia M. Anderson, Southfield; Ronald G. Breuhan, Farmington Hills, all of Mich.

[73] Assignee: Ford Motor Company, Dearborn, Mich.

[21] Appl. No.: 11,916

[22] Filed: Feb. 1, 1993

[51] Int. Cl.⁵ .................. F16L 37/22; F16L 37/084
[52] U.S. Cl. ................................ 285/23; 285/318; 285/321; 285/351
[58] Field of Search ............... 285/23, 318, 307, 321, 285/39, 351

[56] References Cited

U.S. PATENT DOCUMENTS

| | | | |
|---|---|---|---|
| 2,757,942 | 8/1956 | Eberhart | 285/7 |
| 2,914,344 | 11/1959 | Anthes | 285/93 |
| 2,939,728 | 6/1960 | Bitel | 285/315 |
| 3,339,947 | 9/1967 | Maisey | 285/315 |
| 3,439,944 | 4/1969 | Leutenegger | 285/321 |
| 3,700,112 | 10/1972 | Maeshiba | 210/445 |
| 3,918,679 | 11/1975 | Silvana | 251/149.1 |
| 4,055,359 | 10/1977 | McWethy | 285/39 |
| 4,193,616 | 3/1980 | Sarson et al. | 285/321 |
| 4,362,323 | 12/1982 | Lodder et al. | 285/23 |
| 4,376,525 | 3/1983 | Frémy | 251/149.6 |
| 4,401,326 | 8/1983 | Blair | 285/318 |
| 4,606,564 | 8/1986 | Kurachi | 285/318 |
| 4,632,434 | 12/1986 | Proctor et al. | 285/39 |
| 4,641,859 | 2/1987 | Walters | 285/27 |
| 4,647,082 | 3/1987 | Fournier et al. | 285/315 |
| 4,659,119 | 4/1987 | Reimert | 285/318 |
| 4,728,130 | 3/1988 | Corzine | 285/318 |
| 4,750,762 | 6/1988 | Corzine | 285/318 |
| 4,783,101 | 11/1988 | Peterson et al. | 285/319 |
| 4,804,290 | 2/1989 | Balsells | 403/326 |
| 4,850,622 | 7/1989 | Suzuki | 285/286 |
| 4,872,710 | 10/1989 | Konecny et al. | 285/81 |
| 4,906,031 | 3/1990 | Vyse | 285/318 |
| 4,923,228 | 5/1990 | Laipply | 285/319 |
| 4,991,882 | 2/1991 | Gähwiler | 285/351 |
| 5,002,314 | 3/1991 | Smith | 285/12 |
| 5,005,877 | 4/1991 | Hayman | 285/315 |
| 5,094,494 | 3/1992 | McConnell | 285/318 |
| 5,195,787 | 3/1993 | Bartholomew | 285/319 |
| 5,211,427 | 5/1993 | Washizu | 285/23 |

FOREIGN PATENT DOCUMENTS

| | | | |
|---|---|---|---|
| 0340194 | 11/1989 | European Pat. Off. | |
| 0474335 | 3/1992 | European Pat. Off. | |
| 1277984 | 7/1960 | France | 285/318 |
| 2905035 | 8/1979 | Germany | |
| 4029693 | 1/1992 | Japan | 285/23 |
| 5052286 | 3/1993 | Japan | 285/23 |
| 7802712 | 9/1979 | Netherlands | 285/23 |
| 7312793 | 7/1978 | Switzerland | 285/23 |

*Primary Examiner*—Eric K. Nicholson
*Attorney, Agent, or Firm*—Raymond Coppiellie; Roger L. May

[57] ABSTRACT

A tubular coupling is provided having first and second tubular elements. An annular cage is fixedly mounted on the outer surface of a first section of the first tubular element for defining a chamber with the first section for housing a garter spring. The chamber has an annular passage through which a flared end part extending from a first portion of the second tubular element passes during assembly of the first and second tubular elements to permit the garter spring to pass over the flared end part and contract about the first portion for securing the tubular elements in assembly. An expander ring is provided for expanding and centering the garter spring prior to assembly. Further provided are O-rings retained on the outer surface of the first tubular element for sealing the first tubular element to the second tubular element. The O-rings engage with the second tubular element just before the first and second tubular elements are secured in assembly.

17 Claims, 4 Drawing Sheets

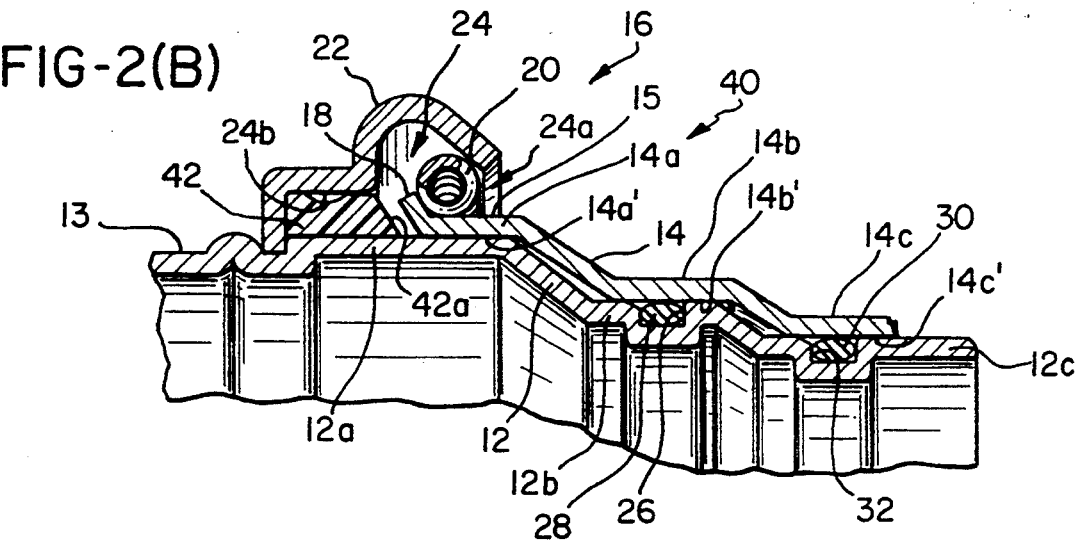
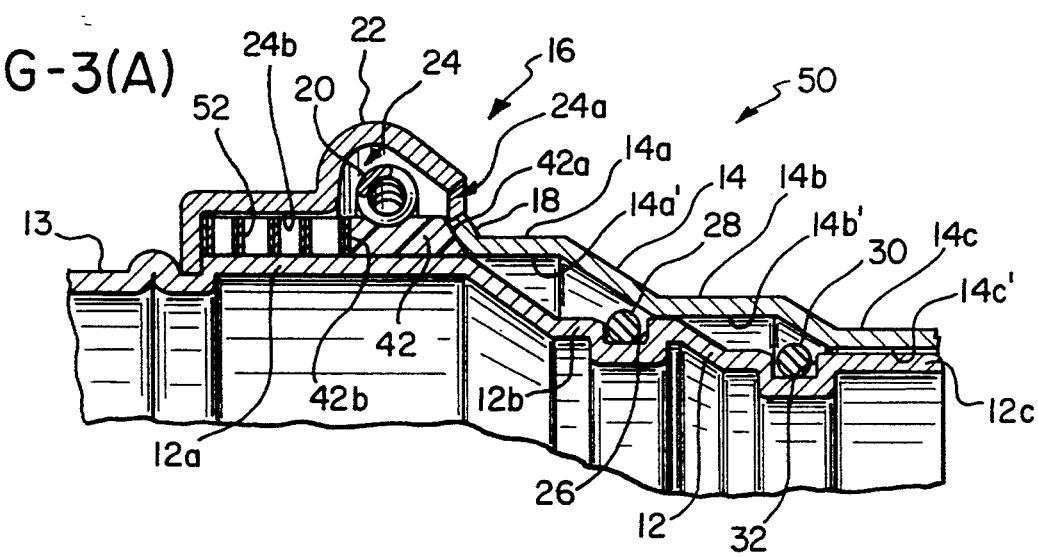
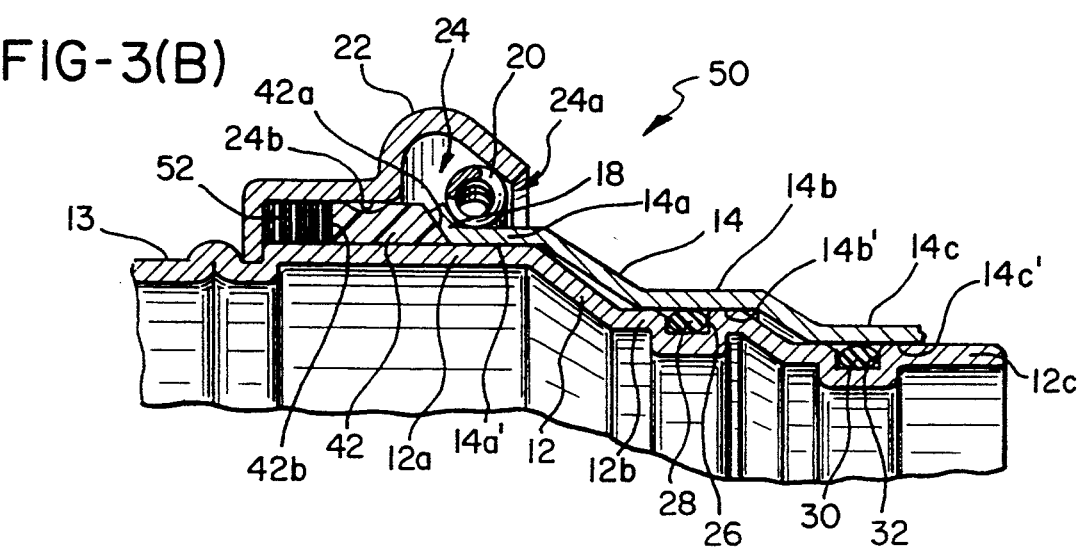

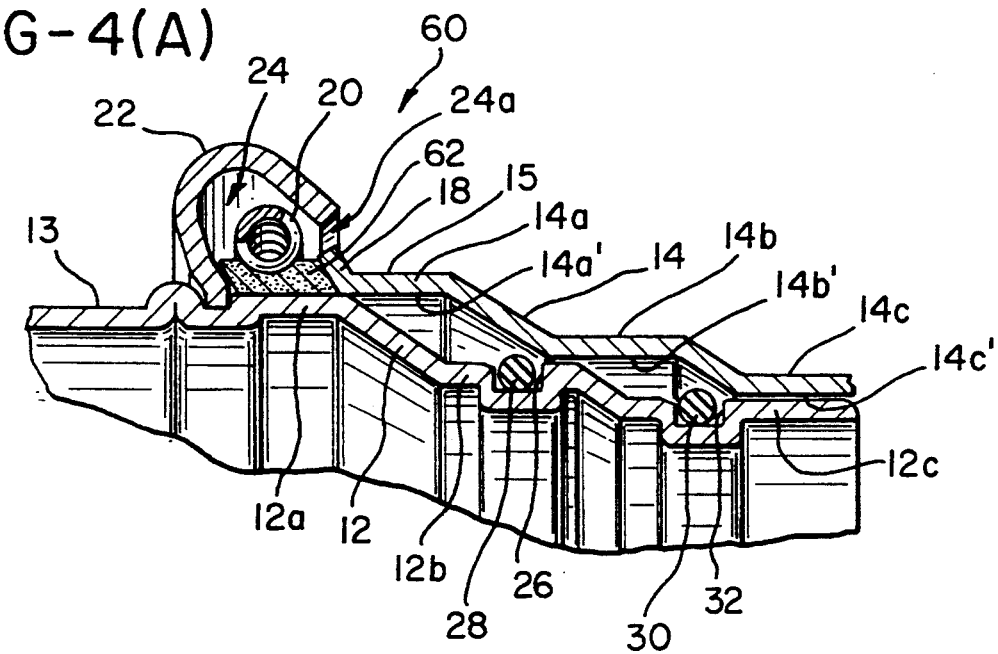
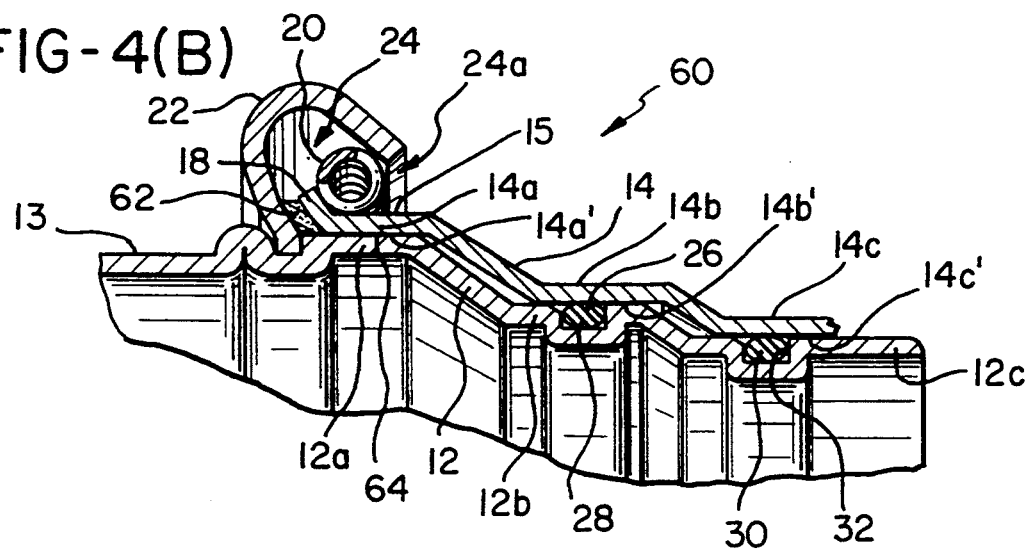

QUICK-CONNECT TUBULAR COUPLING

BACKGROUND OF THE INVENTION

The present invention relates to fluid line couplings and, more particularly, to quick-connect tubular couplings.

In U.S. Pat. No. 4,055,359, a quick-connect tubular coupling is disclosed comprising a pair of tubular elements which, when properly assembled with one another, form a fluid-tight coupling. The first tubular element is provided with an externally mounted cage which houses a garter spring. The end of the second tubular element is flared and sized to be received in the cage. The two tubular elements are assembled by pushing the second tubular element over the first tubular element so that the flared end of the second tubular element enters the cage and forces the garter spring to expand and pass over same. After passing over the flared end, the garter spring is interposed between the cage and the flared end for securing the first and second tubular elements in assembly.

Fluid is prevented from passing from the coupling by a pair of O-rings retained on the first tubular element. The O-rings are positioned at spaced-apart locations along the outer surface of the first tubular element and engage with the inner surface of the second tubular element during assembly. The O-rings are sized so that they are compressed between the two tubular elements after assembly to produce the requisite seal.

Because of their size, the O-rings create frictional resistance to the assembly of the two tubular elements with the resistance increasing when both O-rings are compressed. The resulting frictional resistance has sometimes resulted in an operator mistakenly believing that the coupling has been properly connected when, in fact, it has not. If proper connection is not made, the first and second tubular elements will eventually separate during normal operation resulting in loss of fluid from the system.

Assembly of the first and second tubular elements is further hindered by the substantial force required to expand the garter spring so that it can pass over the flared end of the second tubular element. If the coupling is located in a difficult to reach location of an engine compartment, the substantial force required to expand the garter spring can be especially problematic.

A further problem occurs when the garter spring becomes trapped between the cage and the flared end of the second tubular element. When this occurs, the garter spring is prevented from passing over the flared end of the second tubular element. This may result when the garter spring is not properly centered about the first tubular element prior to assembly.

Accordingly, there is a need for an improved tubular coupling which can be easily assembled by an operator with little risk that an improper connection will be made.

SUMMARY OF THE INVENTION

The present invention meets this need by providing an improved tubular coupling which can be easily assembled by an operator with little risk that an improper connection will be made.

In accordance with a first aspect of the present invention, a tubular coupling is provided having first and second tubular elements. The first tubular element includes first and second sections having first and second outer diameters, respectively. The second tubular element includes first and second portions having first and second inner diameters, respectively. The second tubular element is adapted to be assembled with the first tubular element such that the first section is positioned substantially adjacent to the first portion and the second section is positioned substantially adjacent to the second portion. Securing means is provided for securing the first and second tubular elements in assembly. Also provided is means for sealing the first tubular element to the second tubular element. The sealing means is retained on one of the first and second tubular elements and engages with the other of the first and second tubular elements just before the securing means secures the first and second tubular elements in assembly. If the tubular elements are not correctly assembled, the coupling will not seal and this will be obvious to the installer.

The securing means preferably comprises a flared end part extending from the first portion of the second tubular element, a contractible garter spring, and an annular cage. The annular cage is fixedly mounted on the outer surface of the first section of the first tubular element for defining a chamber with the first section for housing the garter spring. The chamber has an annular passage through which the flared end part passes during assembly of the first and second tubular elements to permit the garter spring to pass over the flared end part and contract about the first portion for securing the first and second tubular elements in assembly.

In accordance with a second aspect of the present invention, a tubular coupling is provided having first and second tubular elements. The second tubular element is adapted to be assembled with the first tubular element such that a first section of the first tubular element is positioned substantially adjacent to a first portion of the second tubular element. Securing means is provided for securing the first and second tubular elements in assembly. The securing means includes spring means for contracting about the first portion of the second tubular element for securing the first and second tubular elements in assembly. Cage means is provided for housing the spring means. Also provided is expander means for centering and expanding the spring means prior to the assembly of the first and second tubular elements to permit easy assembly of same and prevent entrapment of the garter spring. During assembly, the expander means is adapted to be disengaged with the spring means for permitting the spring means to contract about the second tubular element for releasably securing the tubular elements in assembly.

The spring means preferably comprises a garter spring. The expander means preferably comprises an expander ring. The expander ring is positioned between the garter spring and the first section prior to the assembly of the first and second tubular elements and is positioned a spaced distance away from the garter spring after the assembly of the first and second tubular elements.

The expander ring may be formed from a polymeric material, such as polytetrafluoroethylene, polystyrene, neoprene, and nitrile rubber. Alternatively, the expander ring may be formed from a metal, such as aluminum.

The coupling may further comprise return means for applying a force to the expander ring sufficient to move the expander ring from its position a spaced distance away from the garter spring to its position between the garter spring and the first section. The return means preferably comprises a wave spring.

BRIEF DESCRIPTION OF THE DRAWINGS

FIG. 2B is a sectional view of the portion of the tubular coupling shown in FIG. 2A after assembly;

FIG. 3A is a sectional view of a portion of a tubular coupling formed in accordance with a third embodiment of the present invention before assembly is completed;

FIG. 3B is a sectional view of the portion of the tubular coupling shown in FIG. 3A after assembly;

FIG. 4A is a sectional view of a portion of a tubular coupling formed in accordance with a fourth embodiment of the present invention before assembly is completed;

FIG. 4B is a sectional view of the portion of the tubular coupling shown in FIG. 4A after assembly;

DETAILED DESCRIPTION OF THE INVENTION

Figure 1A:
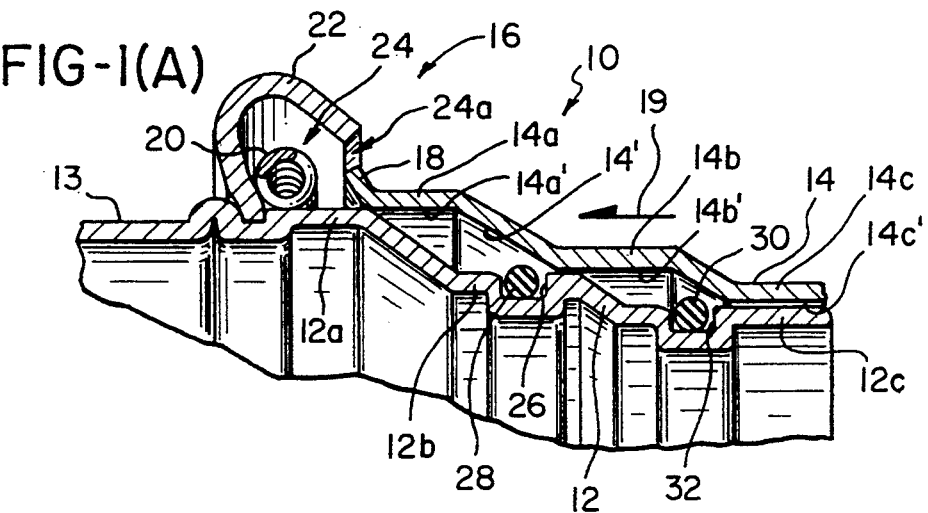
FIG. 1A is a sectional view of a portion of a tubular coupling formed in accordance with a first embodiment of the present invention before assembly is completed.

A sectional view of a portion of a tubular coupling constructed in accordance with a first embodiment of the present invention is shown in FIG. 1A and is generally designated by the reference numeral 10. The tubular coupling 10 comprises first and second tubular elements 12 and 14, respectively. The first tubular element 12 includes first, second and third sections 12a, 12b and 12c, respectively. The outer diameter of the first section 12a is greater than the outer diameters of the second and third sections 12b and 12c, and the outer diameter of the second section 12b is greater than the outer diameter of the third section 12c.

Figure 1B:
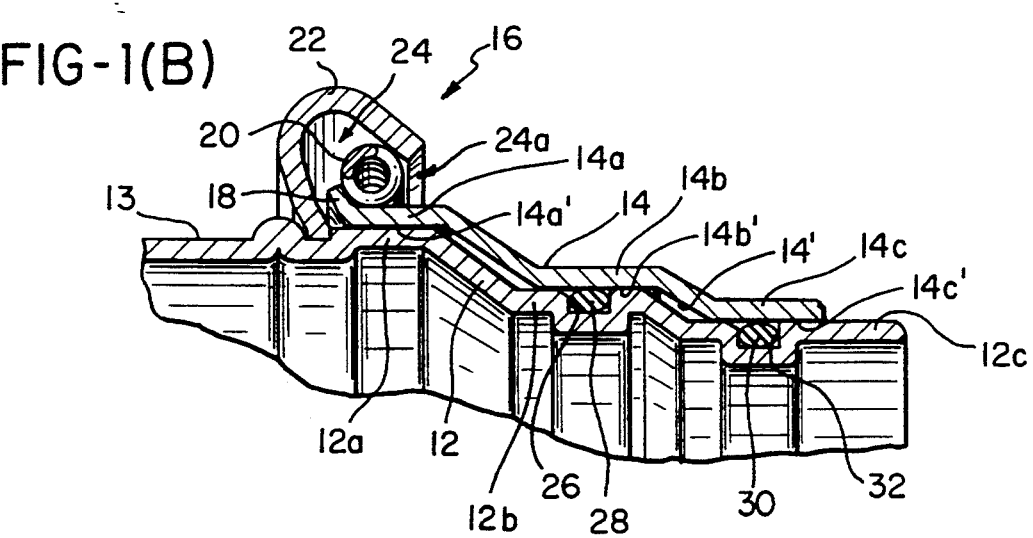
FIG. 1B is a sectional view of the portion of the tubular coupling shown in FIG. 1A after assembly.

The second tubular element 14 includes first, second and third portions 14a, 14b and 14c, respectively. The inner diameter of the first portion 14a exceeds the inner diameters of the second and third portions 14b and 14c, and the inner diameter of the second portion 14b exceeds the inner diameter of the third portion 14c. When the first and second tubular elements 12 and 14 are assembled, the first section 12a is positioned substantially adjacent to the first portion 14a, the second section 12b is positioned substantially adjacent to the second portion 14b, and the third section 12c is positioned substantially adjacent to the third portion 14c, see FIG. 1B.

Securing means 16 is provided for maintaining the first and second tubular elements 12 and 14 in assembly. The securing means 16 includes a flared end part 18 extending from the first portion 14a of the second tubular element 14, a contractible garter spring 20, and an annular cage 22. The annular cage 22 is fixedly mounted on the outer surface 13 of the first section 12a of the first tubular element 12 for defining a chamber 24 with the first section 12a for housing the garter spring 20. The chamber 24 has an annular passage 24a through which the flared end part 18 passes as the second tubular element 14 is moved in a direction, denoted by arrow 19, toward the cage 22 for assembly of the first and second tubular elements 12 and 14. Upon passing into the chamber 24, the flared end part 18 engages with the garter spring 20 and expands the garter spring 20 until it passes over the flared end part 18. After passing over the flared end part 18, the garter spring 20 contracts about the first portion 14a for securing the first and second tubular elements 12 and 14 in assembly, see FIG. 1B.

Retained in a groove 26 provided in the second section 12b of the first tubular element 12 is a first O-ring 28. A second O-ring 30 is retained in a groove 32 provided in the third section 12c. The O-rings 28 and 30 serve to seal the first tubular element 12 to the second tubular element 14 when the tubular elements 12 and 14 have been assembled, i.e., when the first section 12a is positioned substantially adjacent to the first portion 14a, the second section 12b is positioned substantially adjacent to the second portion 14b, and the third section 12c is positioned substantially adjacent to the third portion 14c, see FIG. 1B.

The inner diameter of the first portion 14a is sufficiently large that inner surface 14a' of the first portion 14a passes over the O-rings 28 and 30 during assembly without significant engagement with either O-ring (see FIG. 1A). In a similar manner, the inner diameter of the second portion 14b is sufficiently large that inner surface 14b' of the second portion 14b passes over the O-ring 30 during assembly without significant engagement with same.

The O-rings 28 and 30 engage with the inner surfaces 14b' and 14c' just before the garter spring 20 passes over the flared end part 18 to lock the first and second tubular elements 12 and 14 in assembly. As a result, there is minimal frictional resistance caused by the O-rings 28 and 30 engaging with the inner surface 14' of the second tubular element 14 during the initial phase of assembly of the first and second tubular elements 12 and 14. This reduces the risk that an operator will mistakenly believe, due to the frictional resistance caused by the O-rings 28 and 30 engaging with the inner surface 14' of the second tubular element 14, that the first and second tubular elements 12 and 14 have been properly secured in assembly when, in fact, they have not. Further, since the O-rings 28 and 30 engage the inner surface 14' of the second tubular element 14 at substantially the same point in the assembly procedure, there is no two step increase in the frictional resistance, the second step of which could be interpreted as completed assembly.

It should be apparent that the inner diameter of the first portion 14a need only be large enough to clear the outer surface of the O-ring 28 during assembly. Likewise the inner diameter of the second portion 14b need only be large enough to clear the outer surface of the O-ring 30 during assembly.

Figure 2A:
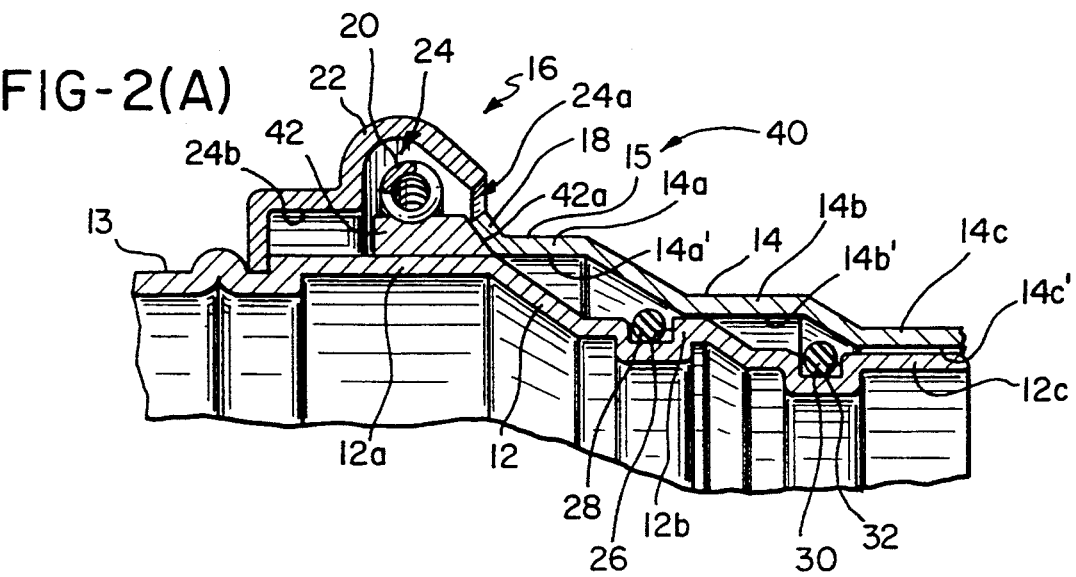
FIG. 2A is a sectional view of a portion of a tubular coupling formed in accordance with a second embodiment of the present invention before assembly is completed.

Sectional views of a portion of a tubular coupling 40, formed in accordance with a second embodiment of the present invention, are shown in FIGS. 2A and 2B, where like reference numerals indicate like elements. In this embodiment, an annular expander ring 42 is provided for centering and expanding the garter spring 20 prior to the assembly of the first and second tubular elements 12 and 14. This permits even easier assembly of the first and second tubular elements 12 and 14 by an operator since little or no force is required to expand the garter spring 20.

The expander ring 42 is initially positioned between the garter spring 20 and the outer surface 13 of the first section 12a of the first tubular element 12, see FIG. 2A. During assembly, the flared end part 18 engages with the front surface 42a of the expander ring 42 and applies a force to the front surface 42a sufficient to move the expander ring 42 from its position shown in FIG. 2A to a position a spaced distance away from the garter spring 20 into an expanded portion 24b of the chamber 24, shown in FIG. 2B. As the expander ring 42 moves from beneath the garter spring 20, the spring 20 passes over the flared end part 18 and contracts about the outer surface 15 of the first portion 14a for securing the first and second tubular elements 12 and 14 in assembly. The expander ring 42 may be made from a metal, such as aluminum, or from a polymeric material, such as polytetrafluoroethylene (sold under the tradename Teflon ®).

Sectional views of a portion of a tubular coupling 50, formed in accordance with a third embodiment of the present invention, are shown in FIGS. 3A and 3B, where like reference numerals indicate like elements. In this embodiment, a return spring 52 is provided for applying a return force to the back surface 42b of the expander ring 42 sufficient to return the expander ring 42 from its position shown in FIG. 3B to its position between the garter spring 20 and the outer surface 13 of the first section 12a, shown in FIG. 3A, as the garter spring 20 is expanded during disassembly. The return spring 52 may additionally force the expander ring 42 to act against the flared end part 18 and push the first and second tubular elements 12 and 14 apart if the garter spring 20 does not pass over the flared end part 18 to lock the tubular elements 12 and 14 in assembly.

A disengagement tool (not shown), such as the one disclosed in commonly assigned U.S. Pat. No. 4,055,359, the disclosure of which is incorporated herein by reference, is used in the disassembly of the first and second tubular elements 12 and 14. The disengagement tool serves to expand the garter spring 20 sufficiently to allow it to pass back over the flared end part 18 while also allowing the expander ring 42 to move, in response to the force applied to it by the return spring 52, beneath the expanded garter spring 20 to the position shown in FIG. 3A. The return spring 52 preferably comprises a wave spring. The return spring 52 is housed in the expanded portion 24b of the chamber 24.

Sectional views of a portion of a tubular coupling 60, formed in accordance with a fourth embodiment of the present invention, are shown in FIGS. 4A and 4B, where like reference numerals indicate like elements. In this embodiment, an annular expander ring 62, formed from a compressible material, such as polystyrene, is provided for centering and partially expanding the garter spring 20.

Upon assembly, the expander ring 62 is compressed by the flared end part 18, as shown in FIG. 4B, to allow the garter spring 20 to contract about the outer surface 15 of the first portion 14a of the second tubular element 14 for securing the first and second tubular elements 12 and 14 in assembly. The contracted ring 62 then serves as a further seal to prevent dust and the like from passing into the interface 64 between the first and second tubular elements 12 and 14. Upon disassembly; the ring 62 expands no move from its position a spaced distance away from the garter spring 20, shown in FIG. 4B, to a position between the garter spring 20 and the outer surface 13 of the first section 12a. The above-noted disengagement tool (not shown) is preferably used during disassembly to expand the garter spring 20 and allow it to pass back over the flared end part 18 while also allowing the expander ring 62 to move to its position beneath the garter spring 20, shown in FIG. 4A.

Figure 5A:
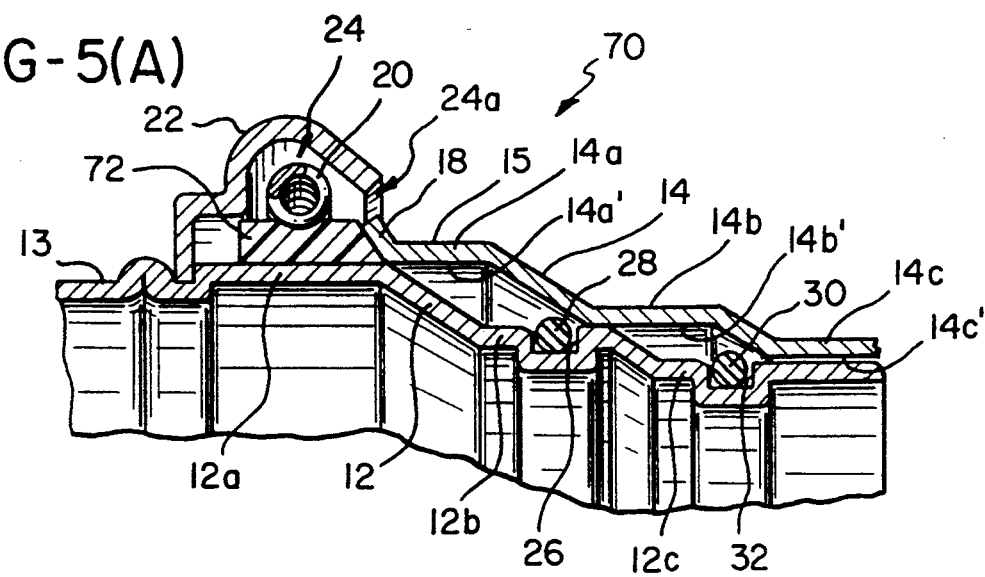
FIG. 5A is a sectional view of a portion of a tubular coupling formed in accordance with a fourth embodiment of the present invention and illustrating the flared end part of the second tubular element engaging with the expander ring for displacing the expander ring from beneath the garter spring.
Figure 5B:
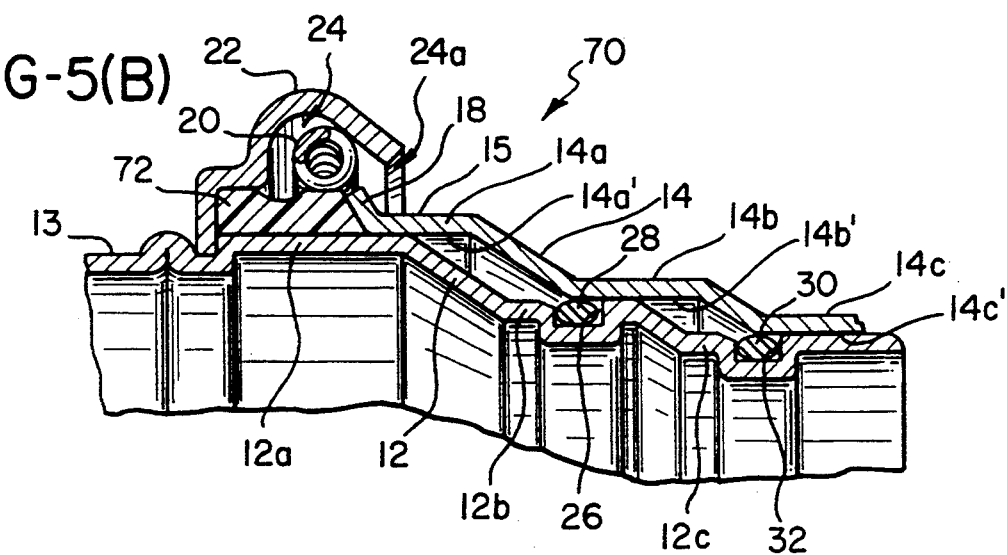
FIG. 5B is a sectional view of the portion of the tubular coupling shown in FIG. 5A and illustrating the expander ring displaced from its position shown in FIG. 5A.
Figure 5C:
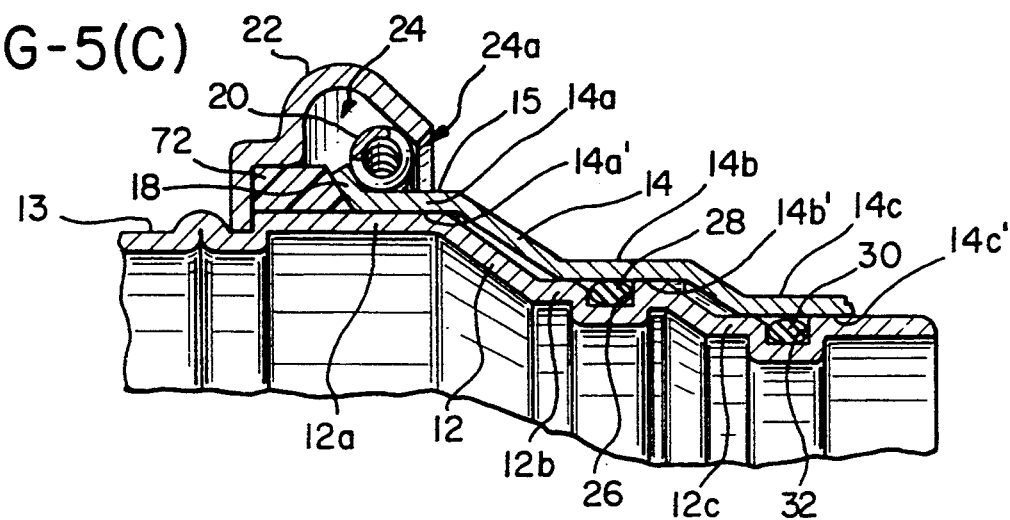
FIG. 5C is a sectional view of the portion of the tubular coupling shown in FIG. 5B after assembly.

Sectional views of a portion of a tubular coupling 70, formed in accordance with a fifth embodiment of the present invention, are shown in FIGS. 5A–5C, where like reference numerals indicate like elements. In this embodiment, an annular expander ring 72, formed from a contractible polymeric material, such as neoprene or nitrile rubber, is provided. The expander ring 72 is engaged, moved and compressed by the flared end part 18 during assembly, as shown in FIGS. 5B and 5C, to allow the garter spring 20 to pass over the flared end part 18 and subsequently contract about the outer surface 15 of the first portion 14a for securing the first and second tubular elements 12 and 14 in assembly.

Upon disassembly, the expander ring 72 expands and moves from its position a spaced distance away from the garter spring 20, shown in FIG. 5C, to its position between the garter spring 20 and the outer surface 13 of the first section 12a, shown in FIG. 5B. Preferably, the above-noted disengagement tool (not shown) is used during disassembly to expand the garter spring 20 so that the expander ring 72 can move beneath the garter spring 20.

With the present invention, an improved quick-release tubular coupling is provided which is easily assembled by an operator. Ease in assembly results because the O-rings engage with the inner surface of the second tubular element just before the securing means secures the first and second tubular elements in assembly. Ease in assembly is also attributable to the use of an expander ring. The tubular coupling of the present invention may be used on automotive air conditioning fluid lines, fuel lines and the like.

Having described the invention in detail and by reference to preferred embodiments thereof, it will be apparent that modifications and variations are possible without departing from the scope of the invention defined in the appended claims.

For example, it is contemplated by the present invention that the O-ring 28 could be formed from a lower cost material than that which is used for the O-ring 30. The O-ring 28 serves mainly to prevent dust and the like from passing through the coupling interface 64. The O-ring 30, on the other hand, serves mainly to prevent fluid flowing through the coupling from leaking therefrom. The O-ring 30 should be formed from a material resistant to the fluid flowing through the coupling, which can comprise a refrigerant or an oil. Such materials are usually costly and need not be used when forming the O-ring 28. In is additionally contemplated that the O-rings could be color-coded to allow proper assembly of same in the grooves 26 and 32 on the first tubular element 12.

What is claimed is:

1. A tubular coupling comprising:

a first tubular element including first and second sections, said first section having a first outer diameter and said second section having a second outer diameter;

a second tubular element including first and second portions, said first portion having a first inner diameter and said second portion having a second inner diameter, said second tubular element being adapted to be assembled with said first tubular element such that said first section is positioned substantially adjacent to said first portion and said second section is positioned substantially adjacent to said second portion;

means for securing said first and second tubular elements in assembly, said securing means including an end part extending from said first portion of said second tubular element, a contractible garter spring, an annular cage fixedly mounted on the outer surface of said first section of said first tubular element for defining a chamber with said first section for housing said garter spring, said chamber having an annular passage through which said end part passes during assembly of said first and second tubular elements to permit said garter spring to pass over said end part and contract about said first portion of said second tubular element for securing said first and second tubular elements in assembly;

means for sealing said first tubular element to said second tubular element, said sealing means being retained on one of said first and second tubular elements and engaging with the other of said first and second tubular elements just before said securing means secures said first and second tubular elements in assembly; and, expander means positioned between said garter spring and said first section for expanding said garter spring prior to the assembly of said first and second tubular elements to permit easy assembly of said first and second tubular elements and being disengageable with said garter spring to permit said garter spring to contract about and engage substantially only said second tubular element for securing said first and second tubular elements in assembly.

2. A tubular coupling as set forth in claim 1, wherein said first inner diameter of said first portion exceeds said second outer diameter of said second section.

3. A tubular coupling as set forth in claim 1, wherein said sealing means comprises an O-ring retained on said second section.

4. A tubular coupling as set forth in claim 3, wherein said first inner diameter of said first portion exceeds the outer diameter of said O-ring retained on said second section.

5. A tubular coupling as set forth in claim 1, wherein said first inner diameter of said first portion is greater than said second inner diameter of said second portion.

6. A tubular coupling as set forth in claim 1, wherein said first tubular element further includes a third section having a third outer diameter and said second tubular element further includes a third portion having a third inner diameter.

7. A tubular coupling as set forth in claim 6, wherein said sealing means comprises a first O-ring retained on said second section and a second O-ring retained on said third section.

8. A tubular coupling as set forth in claim 1, wherein said end part comprises a flared end part.

9. A tubular coupling comprising:

a first tubular element having a first section;

a second tubular element having a first portion, said second tubular element being adapted to be assembled with said first tubular element such that said first section is positioned substantially adjacent to said first portion;

means for securing said first and second tubular elements in assembly, said securing means including spring means for contracting about said first portion of said second tubular element for securing said tubular elements in assembly; and, expander means engageable with said spring means for expanding said spring means prior to the assembly of said first and second tubular elements to permit easy assembly of said first and second tubular elements and being disengageable with said spring means to permit said spring means to contract about said first portion of said second tubular element for securing said first and second tubular elements in assembly, said expander means comprising an expander ring positioned between said spring means and said first section prior to the assembly of said first and second tubular elements and being disengageable with said spring means to permit said spring means to contract about said second tubular element for securing said first and second tubular elements in assembly.

10. A tubular coupling as set forth in claim 9, wherein said spring means comprises a garter spring.

11. A tubular coupling as set forth in claim 9, wherein said expander ring is formed from a polymeric material.

12. A tubular coupling as set forth in claim 11, wherein said polymeric material is selected from the group consisting of polytetrafluoroethylene, polystyrene, neoprene, and nitrile rubber.

13. A tubular coupling as set forth in claim 9, wherein said expander ring is formed from a metal.

14. A tubular coupling comprising:

a first tubular element having a first section;

a second tubular element having a first portion, said second tubular element being adapted to be assembled with said first tubular element such that said first section is positioned substantially adjacent to said first portion;

means for securing said first and second tubular elements in assembly, said securing means comprising a garter spring for contracting about said first portion of said second tubular element for securing said tubular elements in assembly; and, expander means engageable with said garter spring for expanding said garter spring prior to the assembly of said first and second tubular elements to permit easy assembly of said first and second tubular elements and being disengageable with said garter spring to permit said garter spring to contract about said first portion of said second tubular element for securing said first and second tubular elements in assembly, said expander means comprising an expander ring positioned between said garter spring and said first section prior to the assembly of said first and second tubular elements and positioned a spaced distance away from said garter spring after the assembly of said first and second tubular elements; and return means for applying a force to said expander ring for moving said expander ring from its position a spaced distance away from said garter spring to its position between said garter spring and said first section.

15. A tubular coupling as set forth in claim 14, wherein said return means comprises a wave spring.

16. A tubular coupling comprising:
a first tubular element having a first section;
a second tubular element having a first portion, said second tubular element being adapted to be assembled with said first tubular element such that said first section is positioned substantially adjacent to said first portion;
means for securing said first and second tubular elements in assembly, said securing means including a garter spring for contracting about said first portion of said second tubular element for securing said tubular elements in assembly; and,
expander means engageable with said garter spring for expanding said garter spring prior to the assembly of said first and second tubular elements to permit easy assembly of said first and second tubular elements and being disengageable with said garter spring to permit said garter spring to contract about said first portion of said second tubular element for securing said first and second tubular elements in assembly, said expander means comprising an expander repositioned between said garter spring and said first section prior to the assembly of said first and second tubular elements and positioned a spaced distance away from said garter spring after the assembly of said first and second tubular elements; and wherein said expander ring is formed from a compressible material such that said ring is compressed as it is moved from its position between said garter spring and said first section to its position a spaced distance away from said garter spring, and said expander ring expands as it moves from its position a spaced distance away from said garter spring to its position between said garter spring and said first section.

17. A tubular coupling as set forth in claim 9, wherein said securing means further comprises a flared end part extending from said first portion of said second tubular element, said flared end part being engageable with said expander ring during the assembly of said first and second tubular elements for axially moving said expander ring along said first section to its position a spaced distance away from said garter spring.

* * * * *